(12) United States Patent
Takada

(10) Patent No.: US 7,357,552 B2
(45) Date of Patent: Apr. 15, 2008

(54) SURFACE LIGHT SOURCE DEVICE AND DISPLAY

(75) Inventor: Susumu Takada, Tokyo (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/319,157

(22) Filed: Dec. 28, 2005

(65) Prior Publication Data

US 2006/0176712 A1    Aug. 10, 2006

(30) Foreign Application Priority Data

Dec. 28, 2004    (JP)    ............................. 2004-380783

(51) Int. Cl.
*F21V 7/04* (2006.01)
(52) U.S. Cl. ...................... 362/608; 362/612; 362/627; 362/628
(58) Field of Classification Search ................ 362/603, 362/606, 608, 609, 612, 621, 623, 625, 626, 362/628
See application file for complete search history.

(56) References Cited

U.S. PATENT DOCUMENTS

| | | | |
|---|---|---|---|
| 6,676,268 B2 * | 1/2004 | Ohkawa | ...................... 362/613 |
| 6,731,355 B2 * | 5/2004 | Miyashita | ..................... 349/65 |
| 6,761,461 B2 * | 7/2004 | Mizutani et al. | ............. 362/600 |
| 7,004,628 B2 * | 2/2006 | Morgan | .......................... 383/6 |
| 7,056,004 B2 * | 6/2006 | Mizutani et al. | ............ 362/613 |
| 2003/0156328 A1 * | 8/2003 | Goto et al. | .................. 359/599 |

FOREIGN PATENT DOCUMENTS

| | | |
|---|---|---|
| JP | 11-133425 | 5/1999 |
| JP | 2003-331628 | 11/2003 |

* cited by examiner

*Primary Examiner*—Thomas M. Sember
(74) *Attorney, Agent, or Firm*—Staas & Halsey LLP

(57) ABSTRACT

An incidence face is formed at a corner portion of a light guide plate having a generally rectangular emission face, being supplied with primary light form a primary light source. The incidence face has a configuration which obtained by applying undulation-modification to an imaginary incidence face that cuts off the corner portion obliquely. This undulation-modification gives the incidence face first and second incidence regions. The first incidence region is provided with unevenness that produces an inner propagation light having a diverging angle greater than that which would be obtained under an imaginary case where primary light was refracted on incident to the imaginary incidence face. The second incidence region is provided with slopes inclined with respect to the imaginary incidence face, causing the emission face to have a reduced unbalance in brightness. The imaginary incidence face may extend in a direction perpendicular to an imaginary angle-bisector passing a corner point of an effective emission area. Both side faces adjacent to the incidence face may make an angle smaller than 90°.

5 Claims, 16 Drawing Sheets

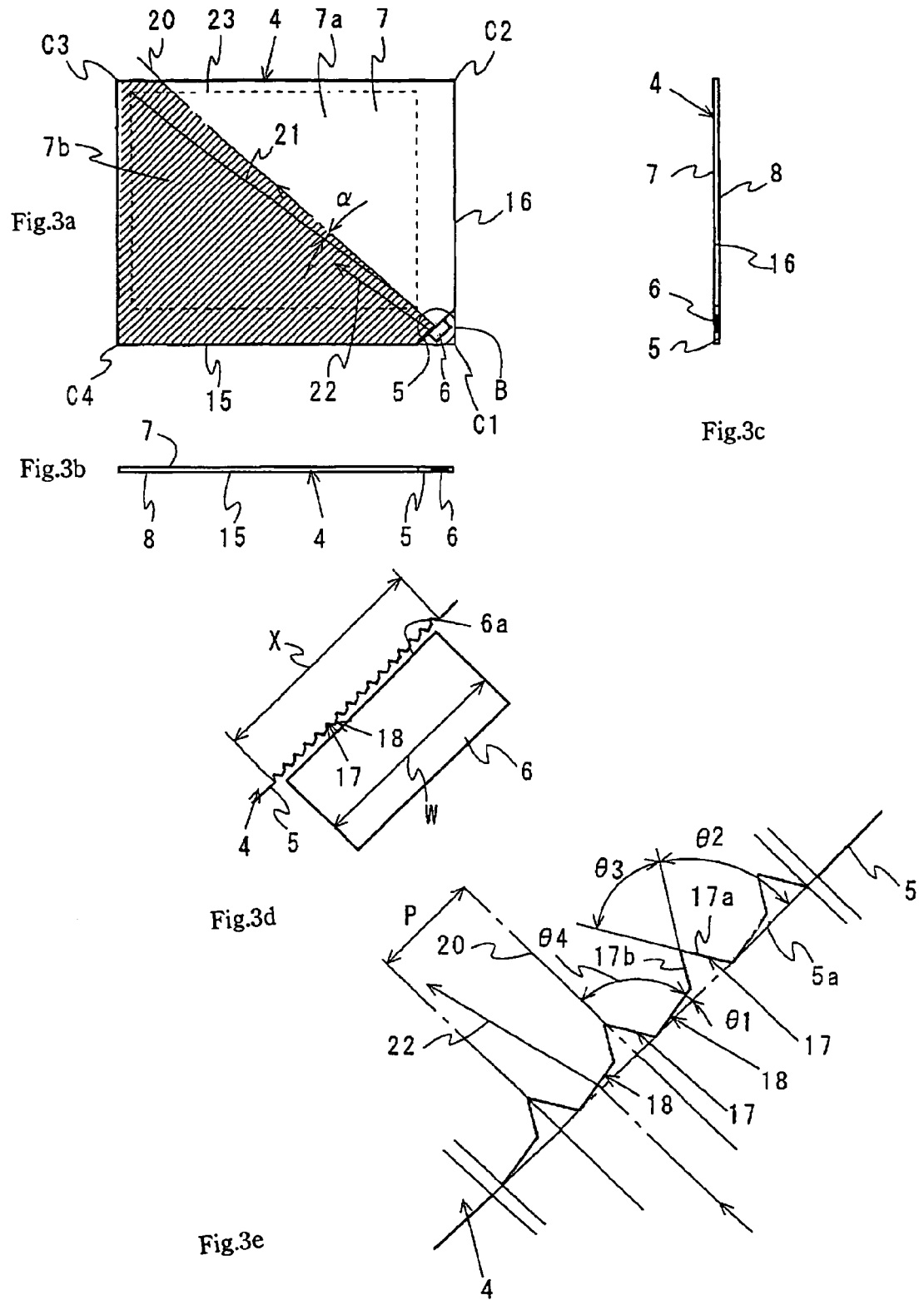

Average
952

Average
893

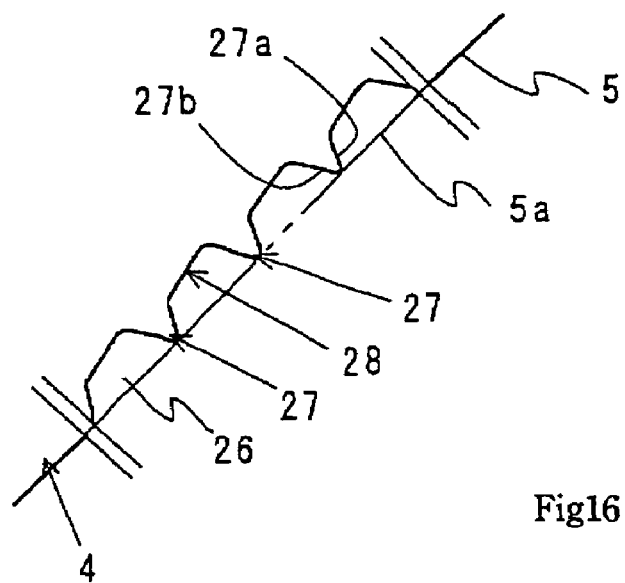
Fig16
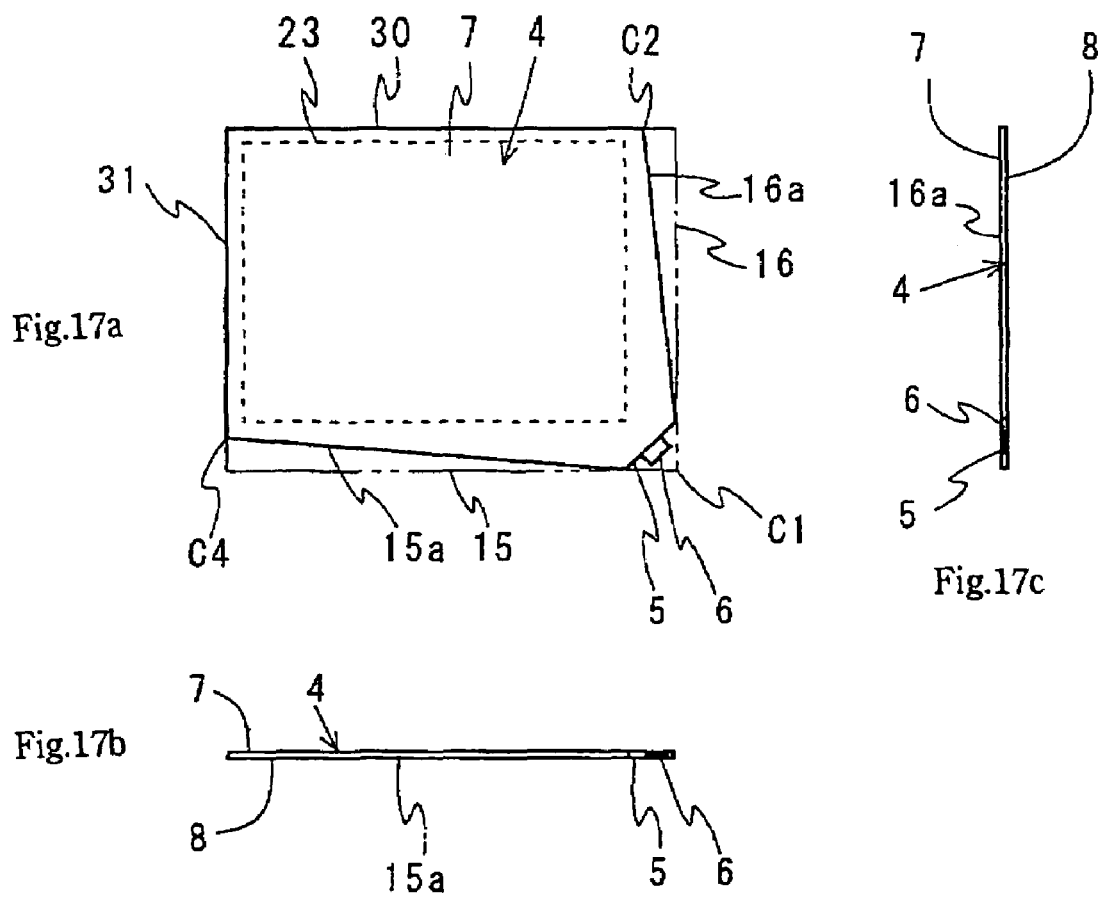
Fig.17a
Fig.17b
Fig.17c

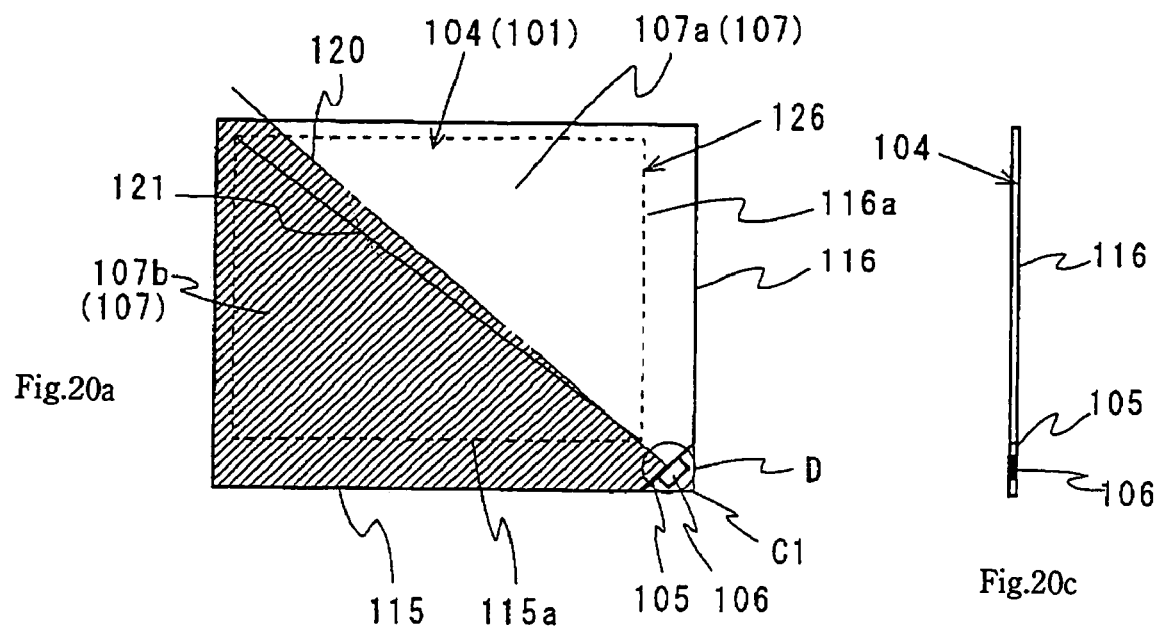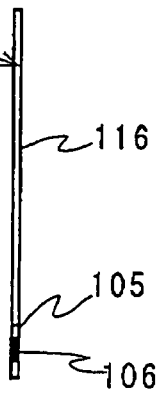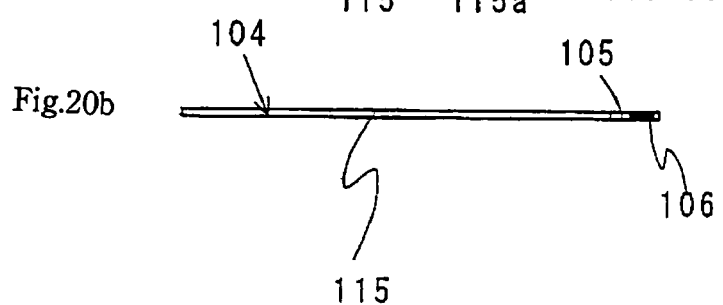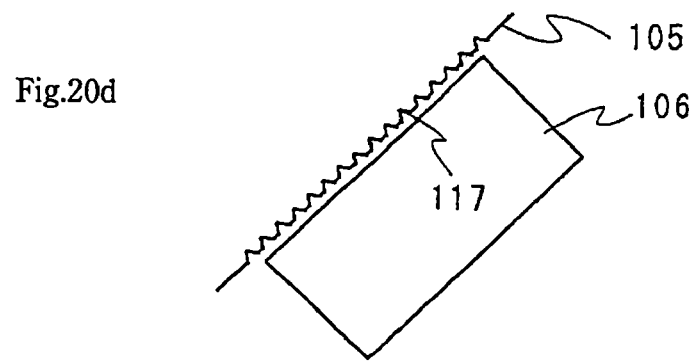
Fig.20a
Fig.20b
Fig.20c
Fig.20d

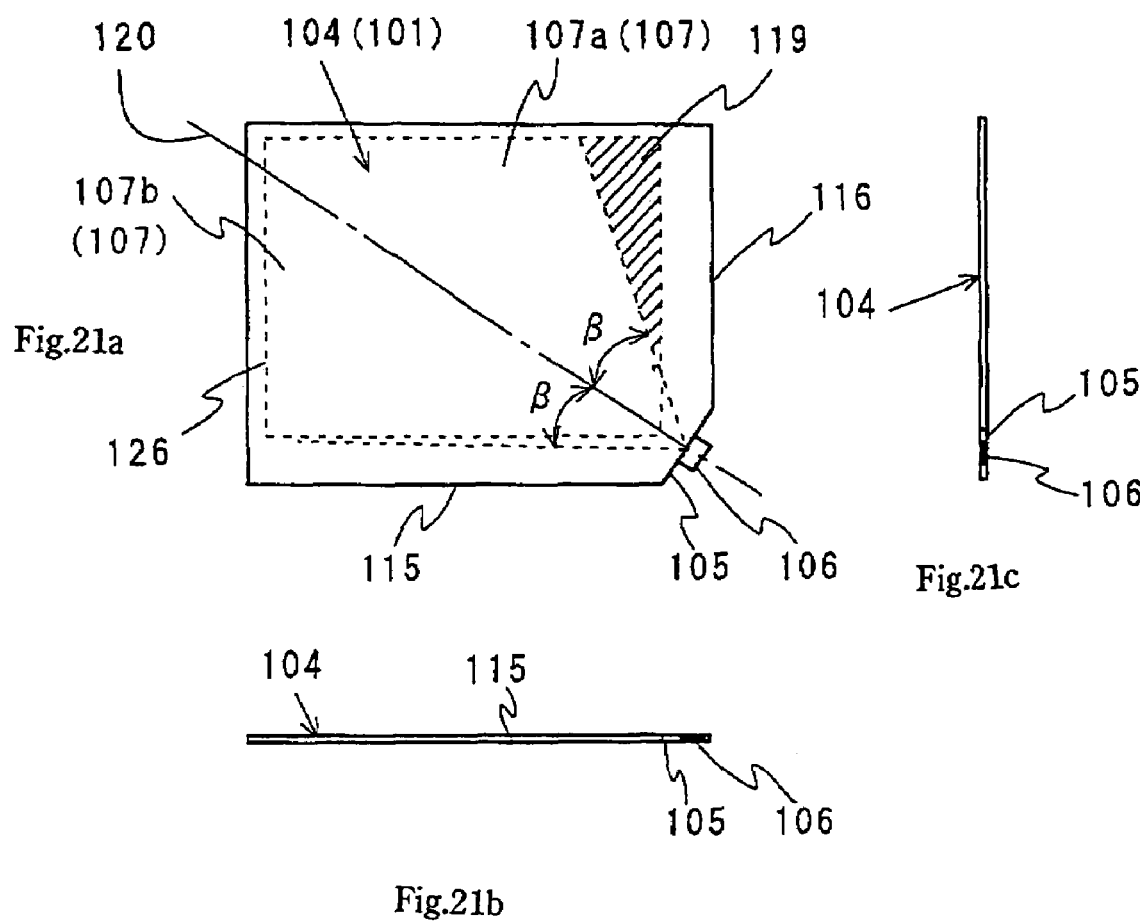

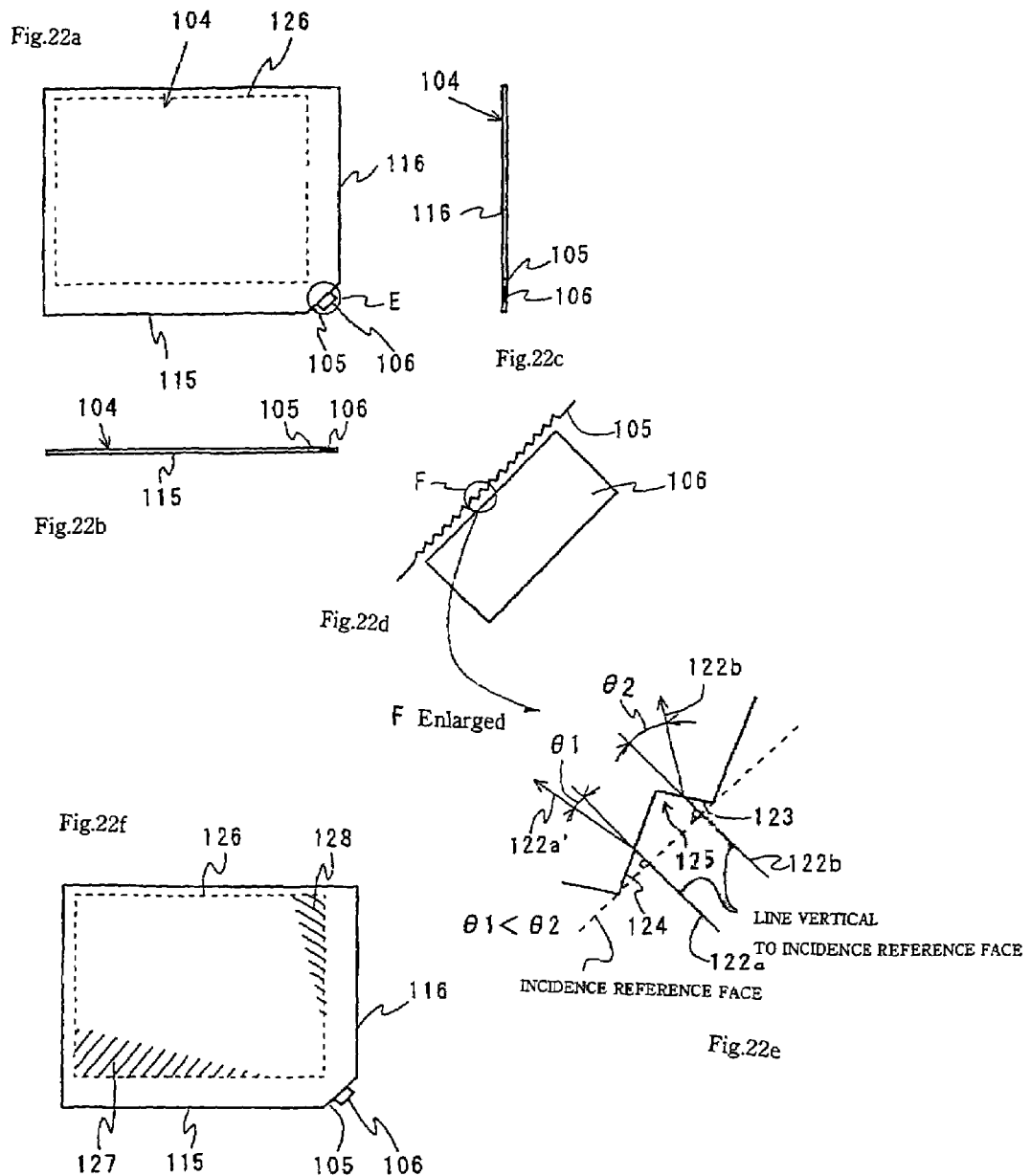

SURFACE LIGHT SOURCE DEVICE AND DISPLAY

BACKGROUND

1. Field of Invention

The present invention relates to a surface light source device used for backlighting an object-to-be-illuminated, and to displays provided with the surface light source device. The present invention is applicable to interior illumination devices or surface light source devices for advertising plate or the likes.

2. Related Art

It is known well to apply a surface light source device to backlighting of an object to be illuminated such as LCD panel. FIG. 19 shows a surface light source device in accordance with of a first prior art. Surface light source device 101 includes light guide plate 104 having a planed shape like a rectangle a corner portion of which is cut off obliquely to provide incidence face 105. LED (point-like light source) 106 is disposed opposite to incidence face 105, light from which enters into light guide plate 104 through incidence face 105 to become an inner propagation light.

The inner propagation light becomes gradually an emission light from emission face 107 of light guide plate 104. The emission light is supplied to LCD panel 103 after transmitting though light control member 114 such as light diffusion sheet. There arises a problem that diverging angle of inner propagation light is not large enough because LED 6 emits light generally having a diverging angle not large enough. This brings an unevenness in emission brightness. In particular, areas near to sides 115, 116 adjacent to incidence face 105 tend to be supplied with insufficient light, being apt to be dark.

FIGS. 20a to 20d illustrate a second prior art employable to overcome such problem, being disclosed in Document 1 noted below. According to the second prior art, light guide plate 104 has incidence face 105 provided with many isosceles-like recesses 117 or prismatic projection rows. Light from LED 106 is much diverged by recesses 117 or prismatic projection rows on entering into light guide plate 104. This causes areas near to sides 115, 116 adjacent to incidence face 105 to be supplied with sufficient light.

However, surface light source device 101 is faced with a problem. In FIG. 20a, a range of effective light emitting surface (effective light emitting area) 126 is a rectangular area denoted by dotted-line. Two sides are denoted by reference numerals 115a and 116a, respectively. Incidence face is formed by cutting off corner portion C1 so that an imaginary line angle-bisecting an angle made by sides 115a and 116a makes the right angle with respect to incidence face 105 (under neglecting unevenness) 105. Optical axis of LED 106 is perpendicular to incidence face 105 (under neglecting unevenness).

It is noted that "optical axis" is defined as a center direction (a travelling direction of the most intensive light) of three-dimensional emission from LED 106. In addition, "effective light emitting area" is defined as an area which is actually used as an emission surface. Usually, a part outside of this area is covered with a frame member.

Emission face 107 of light guide plate 104 can be regarded as being divided into first emission region 107a (out of hatched section) and second emission region 107b (hatched section) by optical axis 1020 of LED 106. Attention is to be paid to a fact that first emission region 107a and second emission region 107b are different from each other in area as understood from FIG. 20a.

That is, second emission region 107b is an emission region including diagonal 121 extending from a corner portion of effective light emitting area 126, which corresponds to corner portion C1, and is larger than first emission region 107b in area. An inner propagation light in light guide plate 104 has a diverging angle of a range generally symmetric with respect to optical axis 120.

As a result, emission light quantity per unit area of first emission region 107a is larger than that of second emission region 107b. This leads to unbalance in brightness.

A third prior art employable to overcome such unbalance in brightness has been proposed, being disclosed in Document 2 noted below. In FIG. 21, a surface light source device of the third prior art is represented by light guide plate 104. This light guide plate 104 is featured by an inclination given to incidence face 105 formed at a corner portion thereof. Namely, incidence face 105 is more inclined with respect to side 115 than with respect to side 116.

In other words, balance of brightness between both sides of optical axis 120 is improved by forming incidence face 105 so that optical axis 120 of LED 106 is inclined toward a region providing abundant long light guiding paths of light guide plate 104.

However, if optical axis 120 of LED 106 is merely inclined toward the region providing abundant long light guiding paths of light guide plate 104 as illustrated in FIG. 21, a dark are (hatched area) 119 can appear in the vicinity of one side 116 if light guide plate 104 is shaped like a non-square-rectangle.

A forth prior art employable to overcome such shortage is illustrated in FIGS. 22a to 22f. According to the forth prior art, incidence face 105 is provided with triangle-like recesses 125, each having a pair of slopes 123 and 124 which have inclination angles asymmetrical with respect to a general extending plane of incidence face 105.

It is noted that a general extending plane of an incidence face formed by cutting off a corner portion of light guide plate is called "imaginary incidence face" in the present specification. An imaginary incidence face for incidence face 105 is denoted by dotted line in FIG. 22e.

In FIG. 22e, light beams 122a, 122b represent light perpendicular to the imaginary incidence face. Light beam 122a is incident to slope 124 having a small inclination angle, becoming light beam 122a'. Light beam 122b is incident to slope 123 having a large inclination angle, becoming light beam 122b'.

It is to be noted that sufficient light is supplied to around side 116 because light beam 122b' involves a larger refraction angle as compared with light beam 122a' ($\theta 1 < \theta 2$).

However, this art involves causing optical axis 102 itself to be biased toward the side of side 116 as compared with a case symmetric slopes are formed. As a result, a dark area 127 is apt to appear on effective light emitting area 126 in the vicinity of side 115, one of sides 115, 116 adjacent to incidence face 105. In addition, an excessively bright area 128 can appear on effective light emitting area 126 in the vicinity of the other side 116.

As described above, conventional surface light source devices fail to have enough ability to cause an emission face of light guide plate to provide a uniform emission.

DOCUMENT 1=Tokkai 2003-331628
DOCUMENT 2=Tokkai-Hei 11-133425

OBJECT AND SUMMARY OF INVENTION

An object of the present invention is to provide a surface light source device improved as to have ability to cause light supplied to a light guide plate from a corner portion to be emitted from an emission face of the light guide plate. Another object of the present invention is to provide a display to which a surface light source device improved as above is applied for backlighting.

According to the present invention, an idea different from those of prior arts is applied to an incidence face of a light guide plate to uniformalize emission brightness.

First, the present invention is applied to a surface light source device comprising a light guide plate having an emission face of a generally rectangular first shape and a primary light source supplying primary light into the light guide plate through an incidence face formed at at least one corner portion of the light guide plate.

According to a feature of the present invention, said incidence face has a configuration looking like that which is obtained by undulation-modification to an imaginary incidence face cutting off said corner portion obliquely as viewed from above said emission face. said undulation-modification giving said incidence face first and second regions.

Said first incidence region is provided with unevenness that produces an inner propagation light having a diverging angle greater than that which would be obtained under an imaginary case where primary light was refracted on incident to the imaginary incidence face. Said second incidence region is provided with a slope inclined with respect to the imaginary incidence face.

Provided that an inner propagation light beam of a first direction is defined as an inner propagation light beam that is produced by being refracted on incidence of a light beam along an optical axis of said primary light source onto said slope and an inner propagation light beam of a second direction is defined as an inner propagation light beam that is imaginarily produced by being refracted on incidence of a light beam along an optical axis of said primary light source onto said imaginary incidence face, said slope is inclined with respect to said second direction as to be deflected toward one of both sides of said second direction so that an brightness unbalance arising in an imaginary case where said first direction accords with said second direction is reduced.

It is noted that said emission face includes an effective emission area having a second shape providing a rectangle which is formed inside of four sides provided by said first shape and smaller than said first shape in length and breadth, and, said second shape provides first and second sides meeting each other in the vicinity of said general extending face.

Said imaginary incidence face may extend in a direction perpendicular to an imaginary angle-bisector which angle-bisects an angle made by said first and second sides and passes a corner point at which said first and second sides meet each other.

Four sides provided by said first shape may include sides which correspond to side faces adjacent to said incidence face and extend as to make an angle smaller than 90°.

The present invention is also applied to a display comprising a display panel and a surface light source device for backlighting the display panel. Displays according to the present invention employ surface light source devices featured as above.

According to the present invention, the first incidence region formed on an incidence face of a light guide plate causes primary light from the primary light source to be diverged to a broad angle range through refraction. In addition, provided that an effective light emitting area is imaginarily divided into two sections by an optical axis of the primary light source, the second incidence region of the light guide plate causes primary light to be refracted so that a larger quantity of inner propagation light is generated in one section greater in area than the other of the sections.

It is noted that "optical axis of inner propagation light" is an optical axis of an inner propagation light beam produced by refraction on incidence of a primary light beam corresponding to the optical axis of the primary light source.

BRIEF DESCRIPTION OF DRAWINGS

FIG. 3a is a plan view of a light guide plate and LED;

FIG. 3b is a lower side view of the light guide plate shown in FIG. 3a;

FIG. 3c is a right side view of the light guide plate shown in FIG. 3a;

FIG. 3d is an enlarged partial view of part B shown in FIG. 3a;

FIG. 3e is a further enlarged partial view of a part of FIG. 3d (vicinity of an incidence face);

FIG. 6a illustrates a configuration of an incidence face of a light guide plate employed in the measurement shown in FIG. 5a;

FIG. 16 is an view of a fifth modification of an incidence face of a light guide plate in accordance with the second embodiment;

FIG. 17a is a plan view of a light guide plate in accordance with a third embodiment;

FIG. 17b is a lower side view of the light guide plate shown in FIG. 17a;

FIG. 17c is a right side view of the light guide plate shown in FIG. 17a;

FIG. 18b is a lower side view of the light guide plate shown in FIG. 18a;

FIG. 18c is a right side view of the light guide plate shown in FIG. 18a;

FIG. 20a is a plan view of a light guide plate in accordance with a second prior art;

FIG. 20b is a lower side view of the light guide plate shown in FIG. 20a;

FIG. 20c is a right side view of the light guide plate shown in FIG. 20a;

FIG. 20d is an enlarged partial view of part D shown in FIG. 20a;

FIG. 21a is a plan view of a light guide plate in accordance with a third prior art;

FIG. 21b is a lower side view of the light guide plate shown in FIG. 21a;

FIG. 21c is a right side view of the light guide plate shown in FIG. 21a;

FIG. 22a is a plan view of a light guide plate in accordance with a fifth prior art;

FIG. 22b is a lower side view of the light guide plate shown in FIG. 22a;

FIG. 22c is a right side view of the light guide plate shown in FIG. 22a; and,

FIG. 22d is an enlarged view of part E shown in FIG. 22a;

FIG. 22e is an enlarged view of part F shown in FIG. 22d; nd,

FIG. 22f is a plan view of a light guide plate for illustrating occurrence of troubles.

EMBODIMENT

First Embodiment (Surface Light Source Device/Display)

Figure 1:
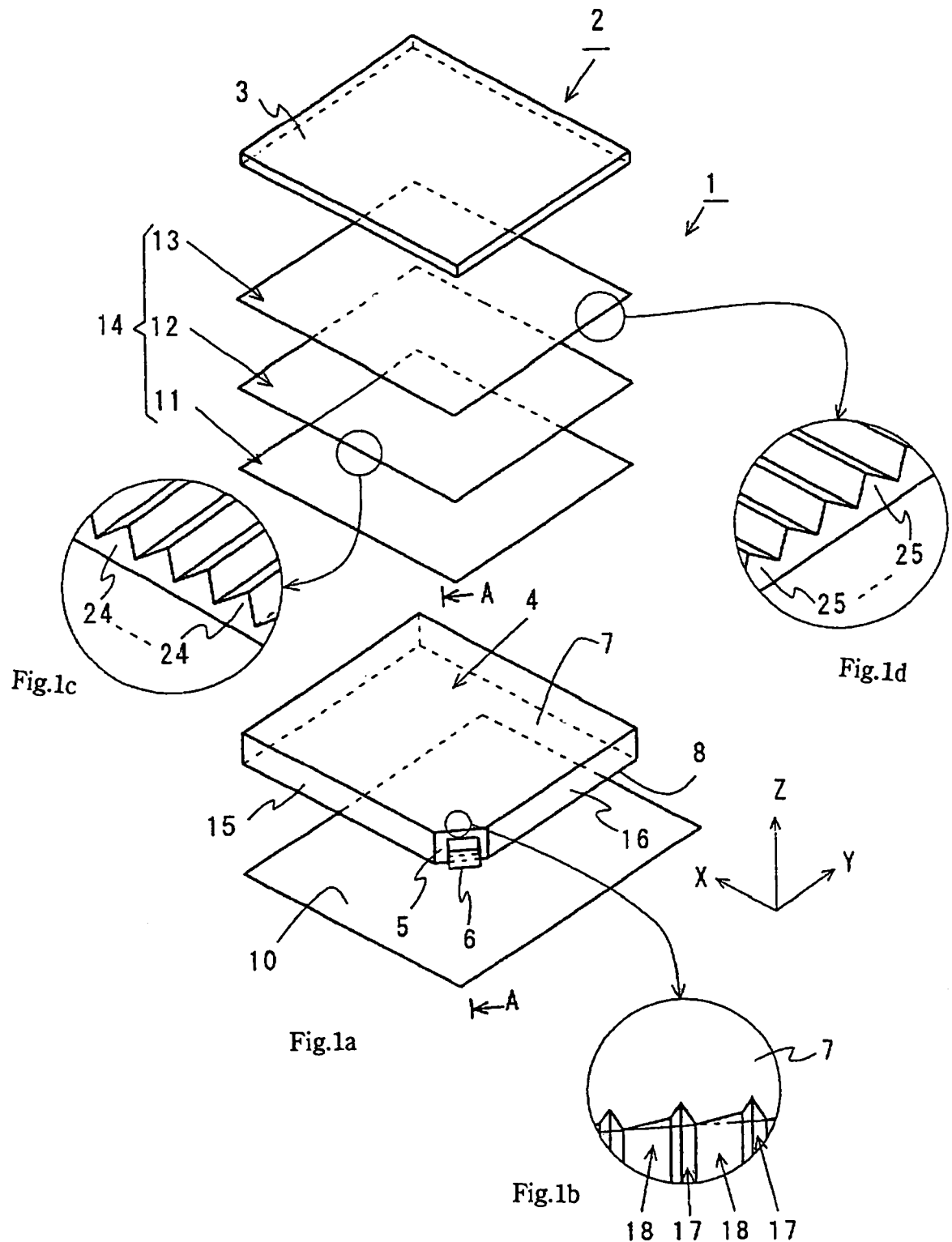
FIG. 1 is an exploded perspective view of a surface light source device and a display employing the same to which the present invention is applied.
Figure 2:
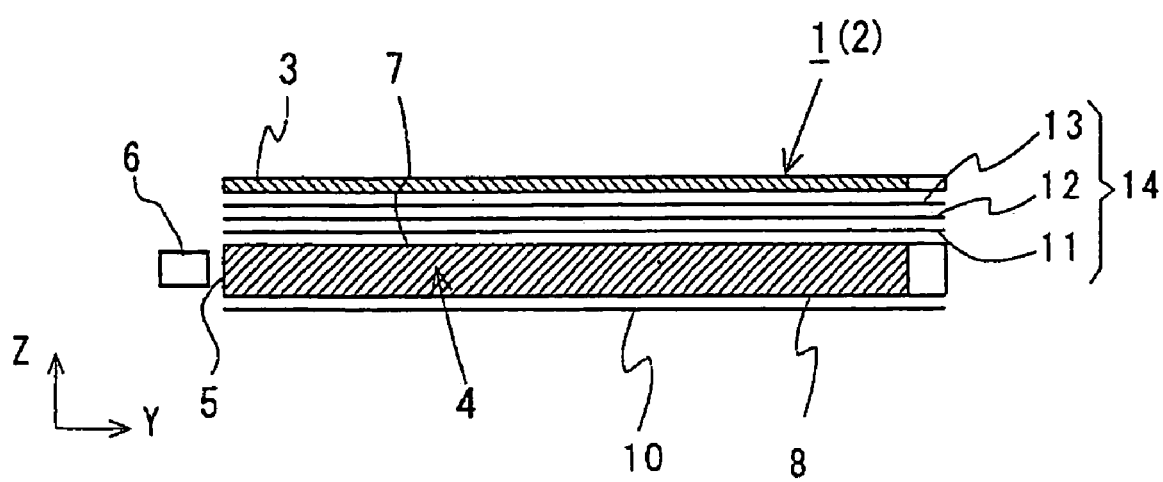
FIG. 2 is a cross section view along A-A in FIG. 1.

Referring to FIGS. 1 and 2, surface light source device 1 and display 2 employing the same which are according to the present invention. FIG. 1 is an exploded perspective view of devices 1 and 2. FIG. 2 is a cross section view along A-A in FIG. 1. It is noted that Z-direction corresponds to the upper direction in FIGS. 1 and 2.

Display 2 comprises surface light source device 1 and LCD panel 3 backlighted by the device 1. Surface light source device 1 is provided with light guide plate 4, LED 6 as a primary light source, light reflection member 8 disposed along back face (a face opposite to emission face 7) 8 and light control members 14 such as light diffusion sheet 11, first and second prism sheets 12, 13 which are laminatedly disposed along emission face 7.

LED 6 supplies light (primary light) into light guide plate 4 through emission face 5 formed by cutting off a corner portion of light guide plate 4. LED 6 preferably supplies white light, and to do so, various manners such as follows may be applied.

(1) White light LED consisting of blue light LED and fluorescent material (2) Three-color-mixing-type white light LED employing RGB light emitting portions within one package.

(3) White light LED employing LEDs respectively emitting R, G arranged near to each other.

It is noted that light sources emitting light other than white light or light sources other than LED may be disposed at an incidence face.

(Light Guide Plate)

Light guide plate 4 is made of a light permeable material such as polymethyl methacrylate (PMMA), polycarbonate (PC) or cycloolefin-type resin. As shown in FIG. 3, light guide plate 4 has a generally rectangular planar shape, having four corner portions C1 to C4. At least of the corner portions is provided with incidence face 5, In the present case, incidence face 5 is formed at one corner portion C1.

Incidence face 5 is a generally rectangular face adjacent to both sides (one side 15 and the other side 16) meeting mutually at corner portion C1, including first incidence region 17 and second incidence region 18.

As shown in FIG. 3e, first and second incidence regions 17, have a configuration looking like that which is obtained by undulation-modification to imaginary incidence face 5a which would be formed by obliquely cutting off corner portion C1, as viewed from above emission face 7. Regions 17, 18 are faced to emitting portion 6a, a portion actually emitting light, of LED 6, being formed alternately and successively in a range (X>W) slightly greater than emitting portion 6a.

First incidence region 17 is provided with a plurality of prismatic grooves (V-like grooves) each of which runs from emission face 7 to back face 8 along a plate thickness direction. Each groove of first incidence region 7 has a right-hand slope 17a and left-hand slope 17b. Right-hand slope 17a extends up to imaginary incidence face 5a and left-hand slope 17b is connected to second incidence region 18 before extending up to imaginary incidence face 5a.

Second incidence region 18 is inclined with respect to imaginary incidence face 5a at angle $\theta1$. Left-hand slope 17b is inclined with respect to imaginary incidence face 5a at angle $\theta2$, wherein a relation $\theta2>\theta1$ is satisfied. That is, second incidence region 18 provides a gentle slope, being connected to left-hand slope 17b and right-hand slope 17a at both right and left ends, respectively.

Second incidence region 18 runs from emission face 7 to back face 8 along a plate thickness direction. Angle $\theta3$ made by right-hand and left-hand slopes 17a, 17b falls in a range from 40° to 90°. Angle $\theta4$ made by a normal direction (direction of incidence optical axis 20) with respect to imaginary incidence face 5a and second incidence region 18 falls in a range from 65° to 85°.

It is noted that incidence optical axis 20 denotes a proceeding direction, after entering into the light guide plate, of light corresponding to an emitting axis defined as a proceeding direction at a center of three-dimensional emission flux rom LED 6, being able to be called "optical axis of inner propagation light".

In addition, imaginary incidence face 5a denotes an imaginary face obtained by cutting off corner portion C1 obliquely as viewed from above emission face 7, and first and second incidence regions 17, 18 can be regarded as a part, to which undulation-modification is applied, of imaginary incidence face 5a.

In this embodiment, side face 15 gives a side length of which is greater than that of a side given by side face 16. Imaginary incidence face 5a is inclined with respect to both side face 15, 16 adjacent to corner portion C1 at an equal angle (45°).

Accordingly, in an imaginary case where imaginary incidence face 5a is employed without applying any undulation-modification (namely, none of first and second incidence regions 17. 18 are formed), incidence optical axis 20 perpendicular to imaginary incidence face 5a is deflected by angle α to the side of side face 16 with respect to diagonal 21 of effective light emitting area 23 of light guide plate 4.

It is noted that "effective light emitting area" 23 denotes an emission face part which is actually used for illuminating, for example, a LCD panel. In general, a uniform emission brightness is required within effective light emitting area 23.

Effective light emitting area 23 has a rectangular shape (second shape) smaller than that of emission face 7 (first shape) in length and breadth. An are surrounding effective light emitting area 23 is an are trimming emission face 7, sometimes being called "picture frame area".

In the above imaginary case, it can be said that effective light emitting area 23 is divided into two regions, first and second emission region 7a and 7b (hatched region), by incidence optical axis 20. First emission region 7a is smaller than second emission region 7b in area. In other words, first emission region 7a involves many short light guiding paths and second emission region 7b involves many long light guiding paths.

Approximately equal amount of light is delivered to both regions 7a and 7b. Therefore, light supply per unit area of first emission region 7a is greater than that of second emission region 7b. As a result, first emission region 7a is brighter than second emission region 7b, providing an unbalance in brightness. The present embodiment reduces such unbalance. The reason is as follows.

Figure 4C:
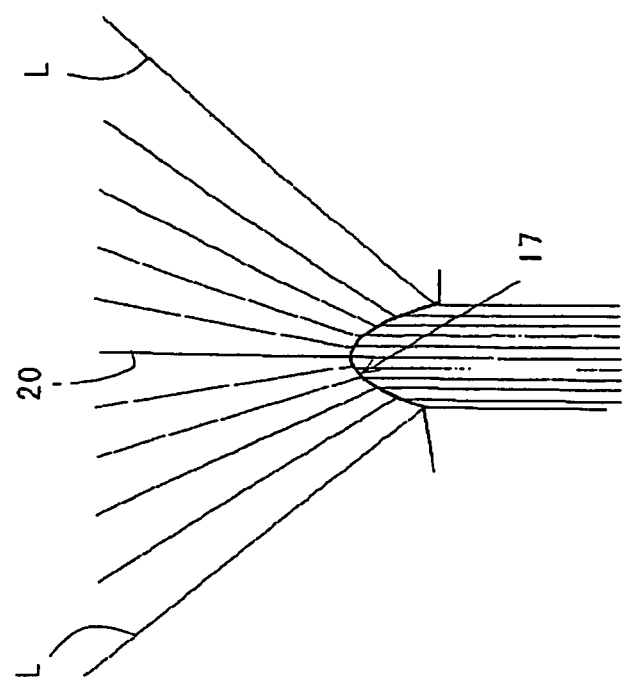
FIG. 4c is an enlarged view of a first incidence region in accordance with a second modification.
Figure 4B:
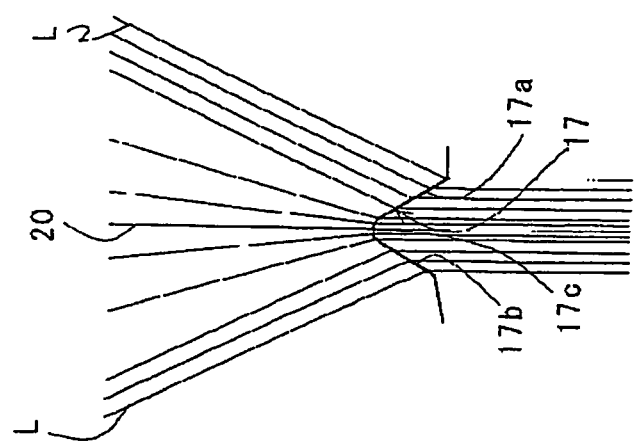
FIG. 4b is an enlarged view of a first incidence region in accordance with a first modification.
Figure 4A:
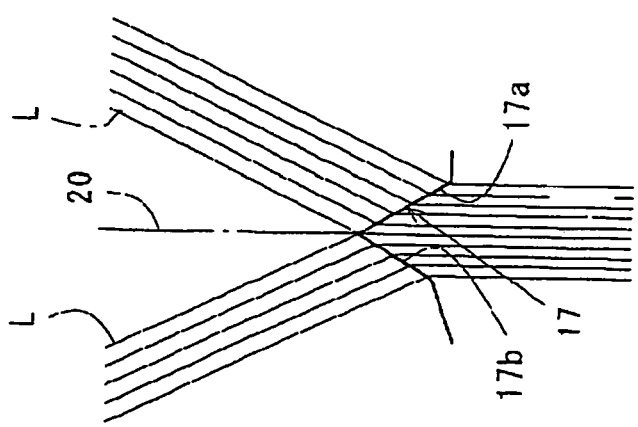
FIG. 4a is an enlarged view of a first incidence region in accordance with a first embodiment.

As shown in FIG. 4a, primary light is represented by beam L of LED 6 parallel to incidence optical angle 20. Grooves of first incidence region 17 an inner propagation light diverged to a broad angular range through refraction. For the sale of understanding functions of second incidence region 18, attention is paid to a diagonal 21 of effective light emitting area 23 running from a corner point of effective light emitting area 23 near to corner portion C1 at which incidence face 5 is formed, as shown in FIGS. 3a and 3e. This corner point is a point at which tow sides of effective light emitting area 23 meet.

Diagonal 2]b runs in second emission region 7b. Incidence optical axis (which may be called "imaginary incidence optical axis") 20 in the above imaginary case is inclined to the side of first emission region 7a with respect to diagonal 21b at angle α. This angle α can be a kind of index expressing degree of the foresaid unbalance.

Second incidence region 18 has a refraction function such that imaginary incidence optical axis 20 is direction-modified to second emission region 7b, as denoted by reference numeral 22 in FIG. 3a, in order to reduce the above degree.

This function causes light amount supplied to second emission region 7b to be increased, reducing brightness unbalance. In other words, angle θ1 is determined sot that such an effect is obtained sufficiently.

Modified incidence optical axis 22 is deflected to the side of side face 15 preferably over diagonal 21. However, an excessive deflection such that a reversed unbalance (making second emission region 7b too bright) arises is not preferable.

Figure 5A:
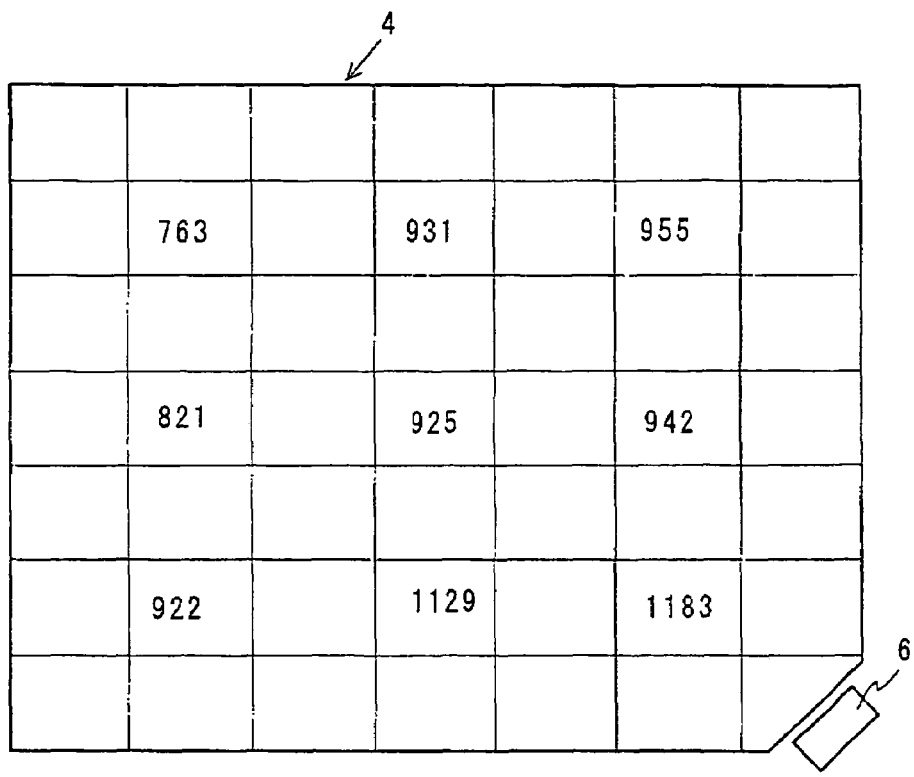
FIG. 5a is a diagram showing a result of measurement of emission brightness of a light guide plate to which the present invention is applied.
Figure 5B:
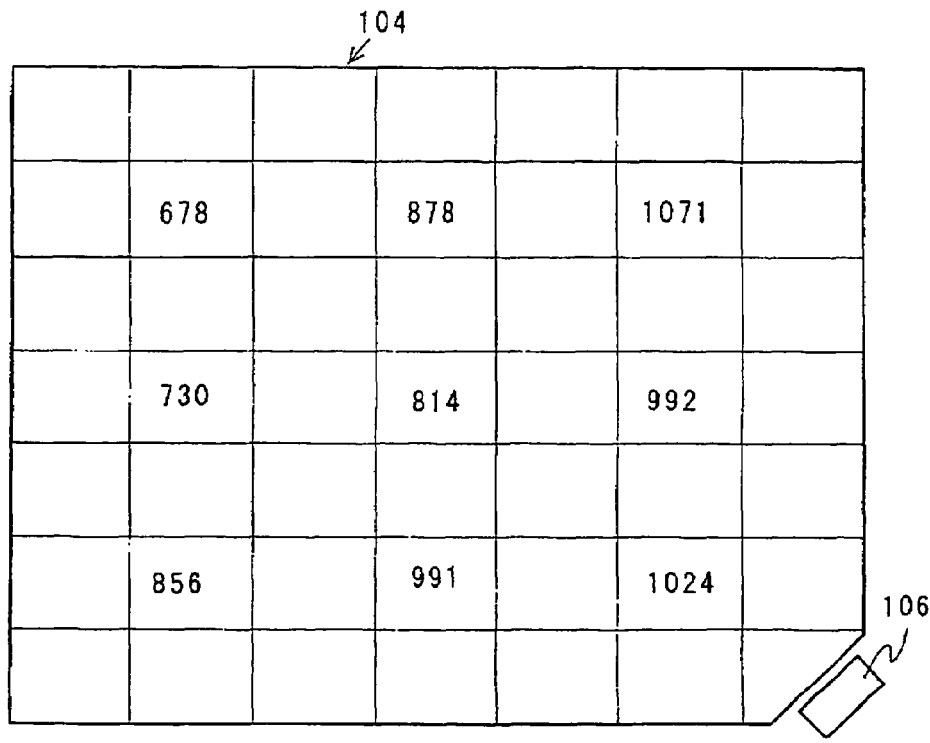
FIG. 5b is a diagram showing a result of measurement of emission brightness of a conventional light guide plate.

FIGS. 5a, 5b give a diagram for comparing emission brightness of light guide plate 4 in accordance with this embodiment and that of conventional light guide plate 104.

FIG. 5a shows values of emission brightness (unit: $cd/m^2$) at measurement points (9 points) of light guide plate 4 and FIG. 5b shows values of emission brightness (unit: $cd/m^2$) at measurement points (9 points) of light guide plate 104, correspondingly.

Figure 6A:
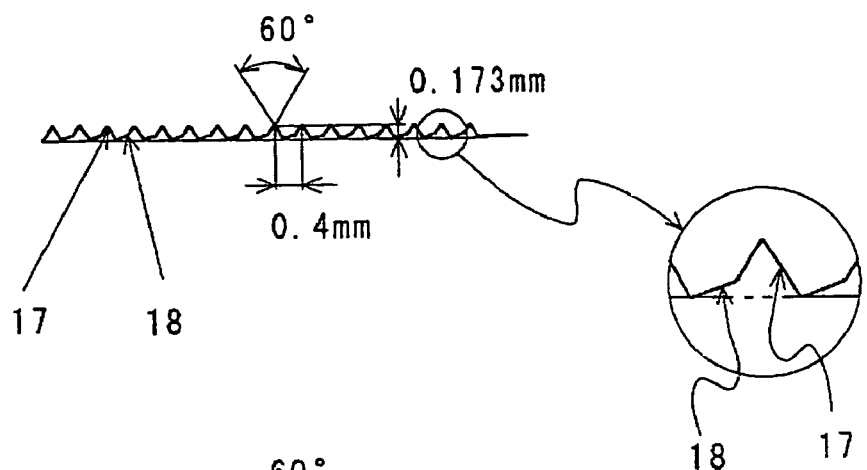
Figure 6B:
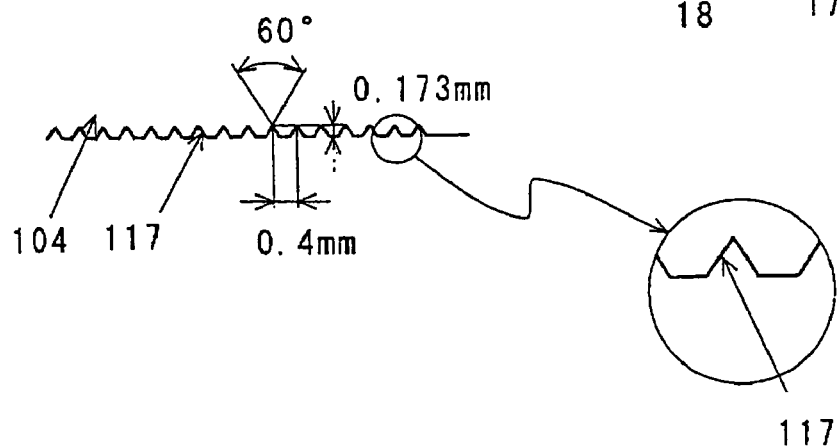
FIG. 6b illustrates a configuration of an incidence face of a light guide plate employed in the measurement shown in FIG. 5b.

It is noted that light guide plate 4 has incidence face 5 provided with an undulation configuration as shown in FIG. 6a. Light guide plate 104 has incidence face 105 provided with an undulation configuration as shown in FIG. 6b. Comparing FIG. 6a with FIG. 6b, there is no difference in configuration (groove angle of 60°/groove depth of 0.173 mm/groove pitch of 0.4 mm) of V-grooves (corresponding to first incidence region 17). However, incidence face 5 is provided with second incidence region 18 inclined with respect to the imaginary incidence face at 15° while no inclination face like that is formed on incidence face 105.

As shown in FIG. 5a, light guide plate 4 gives 3 points respectively located in the vicinity of three corner portions far from LED 6 scores of emission brightness, 955, 763 and 922, respectively.

On the other hand, light guide plate 104 gives 3 points corresponding to the above 3 points scores of emission brightness, 1071, 678 and 856, respectively, as shown in FIG. 5b.

As understood from these scores, light guide plate 4 in accordance with the present embodiment gives a much reduced unbalance between first and second emission regions 7a and 7b in emission brightness as compared with conventional light guide plate 104.

In addition, light guide plate 4 gives a score of 952 as an average emission brightness of the 9 measurement points, which is higher than average score of 893 of the corresponding 9 measuring points of light guide plate 104. This means an improvement in emission brightness as a whole.

It is noted that back face 8 and/or emission face 7 may be provided with an emission-promotion means, not shown, such as rough surface (for example, satin pattern), hemisphere-like, pyramid-like or cone-like projections or recesses. Further, light guide plate 4 may contain scattering elements as an emission-promotion means. This means promotes emission from emission face 7, too.

In this embodiment, first and second incidence regions 17. 18 extend along a plate-thickness direction at incidence face 5. However this does not limit the scope of the present invention. First and second incidence regions 17. 18 may extend obliquely with respect to a plate-thickness of light guide plate 4, and may terminate at positions near to emission face 7 or back face 8 without covering over a range from emission face 7 to back face 8.

(Reflection Sheet)

Light reflection sheet 10 is generally the same shape and size as those of rectangular back face 8, as shown in FIGS. 1 and 2. Light reflection sheet 10 has a reflection surface provided with a regular or irregular reflectivity, being arranged so that the reflection surface is directed to back face 8. Light reflection sheet 10 has a function of returning light leaked through back face 8 into light guide plate 4 through reflection. It is noted that light reflection sheet 10 may be substituted by a reflection surface provided by housing accommodating members including light guide plate 4.

(Light Control Member)

As described previously, light control member 14 employed in this embodiment are light diffusion sheet 11, first and second prism sheets 12, 13 laminatedly disposed in order along emission face 7, which are known elements.

These elements have generally the same shape and size as those of emission face 7. Diffusion sheet 11 is, for example, a light permeable resin sheet having a roughened surface. First and second prism sheets 12, 13 are light permeable resin sheets.

First prism sheet 12 has an upper face provided with many prismatic projection rows 24 with triangle-like cross section running in a direction generally perpendicular to side face 15. Second prism sheet 13 has an upper face provided with many prismatic projection rows 25 with triangle-like cross section running in a direction generally perpendicular to side face 16.

These prism sheets 12, 13 gather emission light supplied via diffusion sheet 11 around a approximately normal direction of emission face 7 through a known effect.

(Effect/Advantage of Surface Light Source Device and Display)

As described previously, according to the this embodiment, first and second incidence regions 17, 18 cause emission brightness of emission face 7 to be uniformalize. Accordingly, LCD panel 3 is illuminated evenly, providing an improved image quality.

(Modifications of Surface Light Source Device and Display)

Surface light source device 1 and Display 2 in accordance with the embodiment allow modifications such as followings.

(1) Prismatic projection rows (not shown) running in a direction (first diagonal direction) generally perpendicular to incidence face 5 may be formed on emission face 8 and/or back face 8 of light guide plate 4.

Such prismatic projection rows deflect light emitted from emission face 7 deflect as to bring near to an approximately normal direction of emission face 7 in a plane perpendicular to the running direction of the projection rows.

In this case, prism sheets 12 and 13 are preferably changed to prism sheets, each having a lower face provided with prismatic projection rows running in a second diagonal direction perpendicular to foresaid first diagonal direction.

Running directions of prism sheets disposed along emission face 7 may be changed, as required, depending on factors such as desired viewing direction, brightness distribution on emission face 7, or degree of tendency of appearing interference stripes.

(2) Although the above embodiment employs light guide plate 4 having an overall uniform thickness, this does not limit the scope of the present invention. For example, thickness may decrease according to an increasing distance away diagonally from incidence face 5.

(3) Another incidence face equivalent to incidence face 5 formed at corner portion C1 in the above embodiment may be formed additionally at another corner portion C2 of light guide plate 4. In this case, LED 6 is disposed additionally in the vicinity of corner portion C2 in the same manner. This arrangement accepts plate-thickness gradually decreasing away from side face 16 as well as constant plate-thickness.

In a similar way, an incidence face equivalent to incidence face 5 formed at corner portion C1 may be formed additionally at another corner portion C4. In this case, LED 6 is disposed additionally in the vicinity of corner portion C4 in the same manner. This arrangement accepts plate-thickness gradually decreasing away from side face 15 as well as constant plate-thickness.

(4) Incidence faces 5 may be formed in a similar way at three or four of corner potions C1 to C4, with LEDs 6 arranged respectively to supply primary light to the respectively corresponding incidence faces 5. In this case, plate-thickness is preferably constant.

(Modifications of First and Second Incidence Regions of Light Guide Plate)

The first and second Incidence Regions 17, 18 allow modifications such as the followings.

(1) As shown in FIG. 4b, a V-groove formed in first incidence region 17 may have a bottom giving a curved surface 17c. In this case, refraction producing light toward various directions occurs in the vicinity of the bottom, resulting in a smoothly diverged light, like a group of beams L shown in the illustration.

Figure 7:
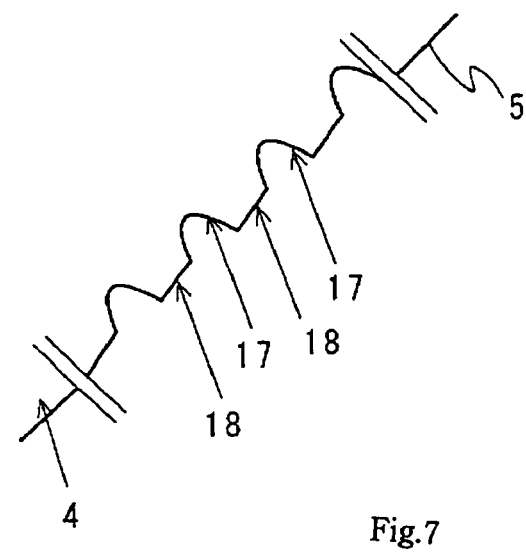
FIG. 7 is an view of a first modification of an incidence face of a light guide plate in accordance with the first embodiment.

(2) As shown in FIG. 4c, a V-groove formed in first incidence region 17 may have a parabolic cross section, and if so configurated, the V-groove will cause incident light L to be diverged almost evenly overall, providing a group of beams L shown in the illustration. It is noted that FIG. 7 shows light guide plate 4 provided with an alternate arrangement of first incidence regions 17 and second incidence regions 18 which are shown in FIG. 4c.

Figure 8:
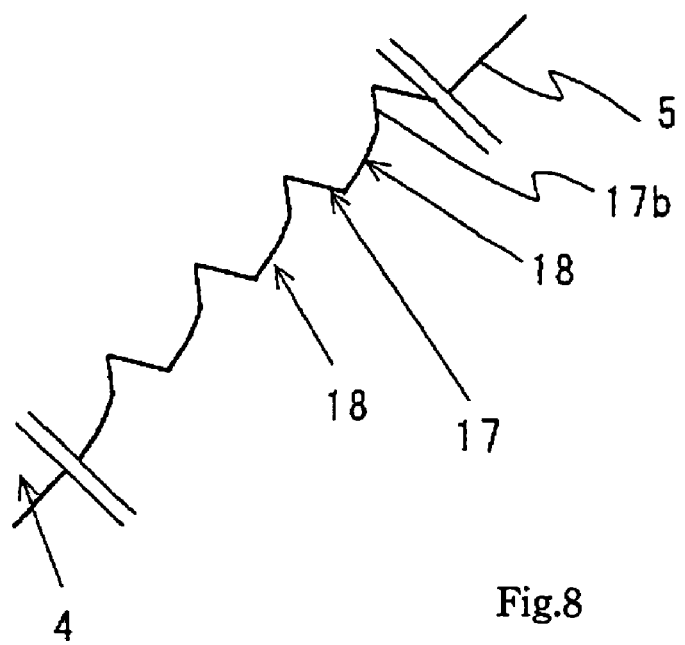
FIG. 8 is an view of a second modification of an incidence face of a light guide plate in accordance with the first embodiment.

(3) As shown in FIG. 8, left-hand slope 17b of first incidence region 17 and second incidence region 18 may be formed of a smooth curved surface.

Figure 9:
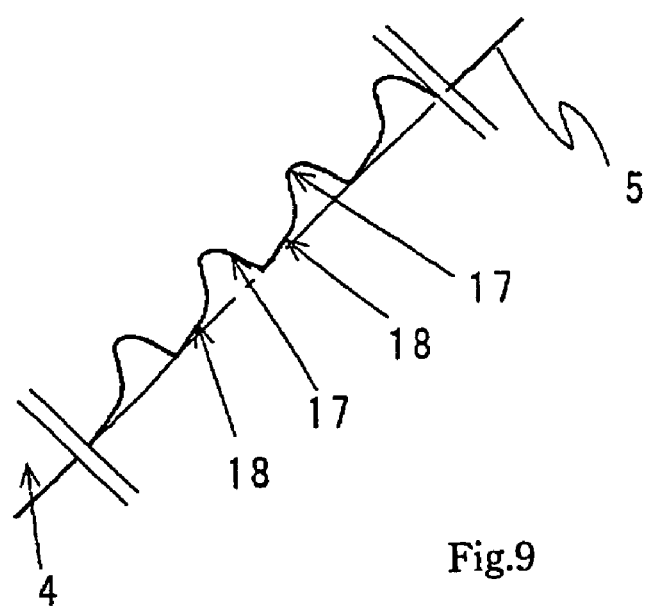
FIG. 9 is an view of a third modification of an incidence face of a light guide plate in accordance with the first embodiment.

(4) As shown in FIG. 9, first incidence region 17 and second incidence region 18 may be formed of a smooth curved surface.

Figure 10:
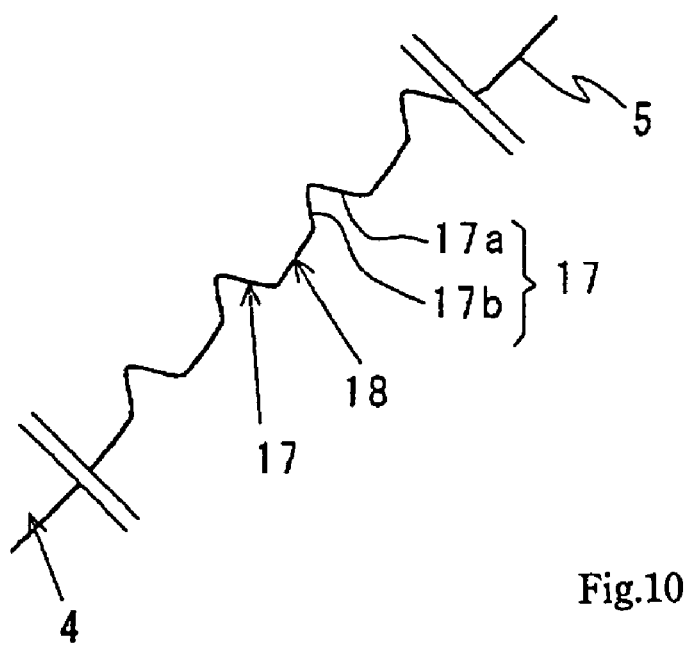
FIG. 10 is an view of a forth modification of an incidence face of a light guide plate in accordance with the first embodiment.

(5) As shown in FIG. 10, small curved surfaces may give a bottom (a portion connecting right-hand and left-hand slopes 17a, 17b to each other) of first incidence region 17, a portion connecting right-hand slope 17a of first incidence region 17 to second incidence region 18, and a portion connecting left-hand slope 17b of first incidence region 17 to second incidence region 18, respectively.

Figure 11:
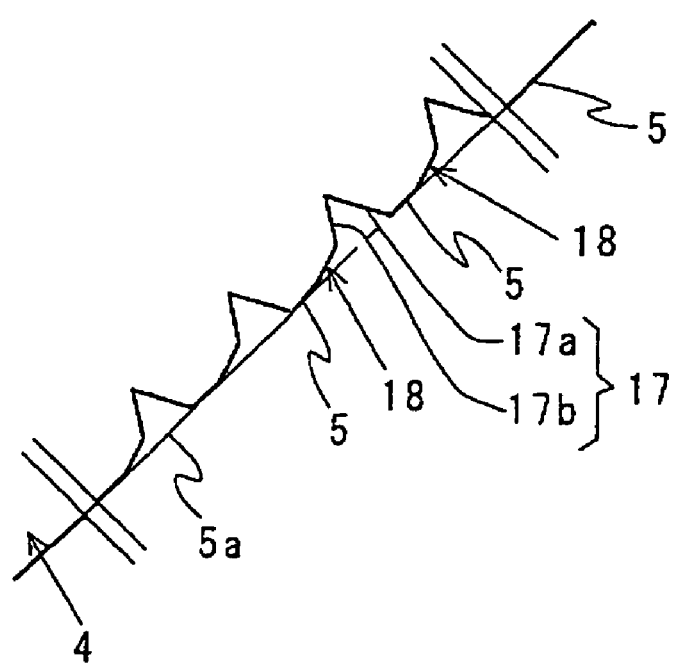
FIG. 11 is an view of a fifth modification of an incidence face of a light guide plate in accordance with the first embodiment.

(6) As shown in FIG. 11, it is acceptable that second incidence region 18 connected to an end left-hand slope 17b of first incidence region 17 reaches imaginary incidence face 5a while second incidence region 18 is connected to the other side 17a of first incidence region 17 via a flat surface flush with imaginary incidence face 5a.

(7) Only right-hand slope 17a of first incidence region 17 and second incidence region 18 connected thereto may be formed of a continuous and smoothly curved surface, which is not show. According to another acceptable modification, only a portion connecting right-hand slope 17a of first incidence region 17 to second incidence region 18 is formed of a curved surface.

(8) In the above-described first embodiment and modifications thereof, first and second incidence regions 17, 18 are arranged successively and alternately. However, this does not limit the scope of the present invention. For instance, an appropriate plural number (for example, two) of first incidence regions 17 may be arranged successively and then may be an appropriate number (for example, two) of second incidence regions 18 may be arranged successively.

Alternatively, first and second incidence regions 17, 18 may be arranged in random succession. In this case, incidence regions 17, 18 are preferably arranged according to an moderate distribution so that neither first incidence regions 17 nor second incidence regions 18 avoids from performing an one-sided function.

It is noted that arrangement pitch P in a case where first and second incidence regions 17, 18 are arranged alternately is preferably greater than wave length of the used light in order to avoid diffraction phenomenon from occurring (not smaller than the minimum pitch P min).

In addition, pitch P is preferably small enough to prevent undulated configuration from bringing blight lines or dark lines around a light inputted portion (not greater than the maximum pitch P max). Taking account of easiness of manufacturing, an exemplary practical range of pitch is from 0.1 mm to 0.5 mm.

(9) Incidence face 5 of light guide plate 4 may be roughened partially or overall. Only an imaginary incidence face may be roughened in order to make a boundary between a portion giving first and second incidence regions 17, 18 and imaginary incidence face, which is not so undulated, blurred. Only first incidence region 17 may be roughened in order to cause light after entering into light guide plate 4 to have a more large diverging angle.

Alternatively, only second incidence region 18 may be roughened in order to cause light after entering into light guide plate 4 to have a moderately weakened directivity. According to still another acceptable modification, roughening may be applied at random positions so fa as functions of the present invention are not spoiled.

(10) Width X of undulated portion shown in FIG. 3 may be equal to light emitting width W of LED 6, or alternatively smaller slightly than light emitting width W. Further more alternatively, width across incidence face 5 may be equal to light emitting width W, or still alternatively, smaller slightly than light emitting width W.

Second Embodiment

If an imaginary line (first imaginary line) angle-bisecting corner portion C1 of light guide plate 4 accords with another imaginary line (second imaginary line) which bisects effective light emitting area 23 and passes a corner point, corresponding to corner portion C1, of effective light emitting area 23, incidence face 5 is preferably formed as to make an equal angle with respect to both side faces (side faces 15, 16) providing corner portion C1.

However, sometimes the above first and second imaginary lines do not accord with each other. In other words, in some case, effective light emitting area 23 is occasionally not located at a center of emission face 7. In the cases, imaginary incidence face 5 is preferably formed as to make the right angle with respect to the foresaid second imaginary line. Except for such, construction the same as that of the first embodiment may be employed. This case avoids brightness to give unbalance between both sides with respect to second imaginary line, although location of effective light-emitting area 23 is deviated from the center of light guide plate 4.

Third Embodiment

Figure 12:
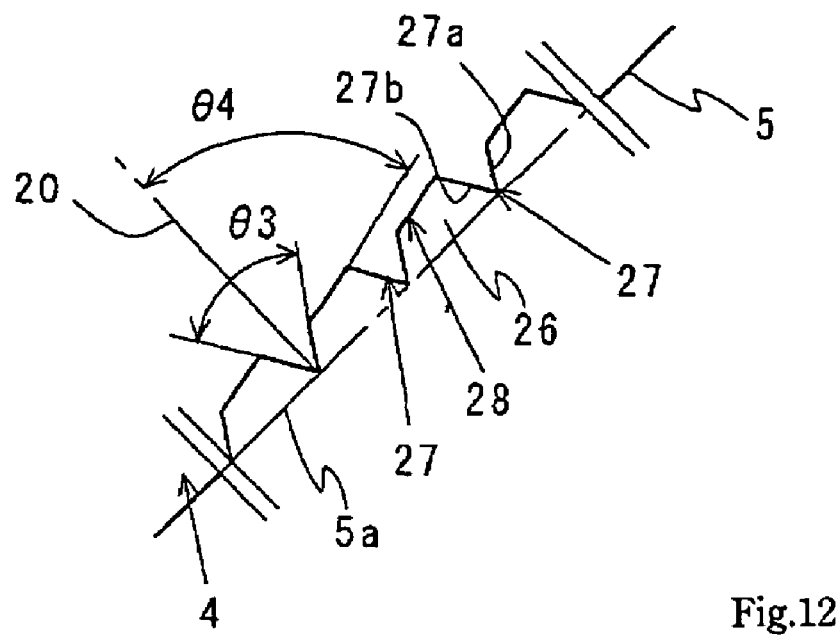
FIG. 12 illustrates a configuration of an incidence face of a light guide plate in accordance with a second embodiment.

FIG. 12 illustrates light guide plate 4 of second embodiment in accordance with the present invention. Light guide plate 4 employed in th second embodiment is subject of undulation-modification that is applied to imaginary incidence face 5a to give a plurality of trapezoid-like recesses 26 successively arranged.

This brings first incidence regions 27 each consisting of right-hand slope 27a forming a triangle-like projection and left-hand slope 27b, and second incidence regions 28 bridging first incidence regions 27, 27 adjacent to each other.

First incidence region 27 is formed as to be symmetric with respect to a normal of imaginary incidence face 5a (i.e. optical axis 20 of LED 6), functioning generally in the same manner as compared with first incidence region 17 employed in the first embodiment.

Second incidence region 28 is inclined as to come near to incidence face 5 according to getting away from one-side end of right-hand-adjacent first incidence region 27 toward an other-side end of left-hand-adjacent first incidence region 27, functioning generally in the same manner as compared with second incidence region 18 employed in the first embodiment.

(Modifications of Third Embodiment)

The above-described third embodiment allows modifications such as the followings.

Figure 13:
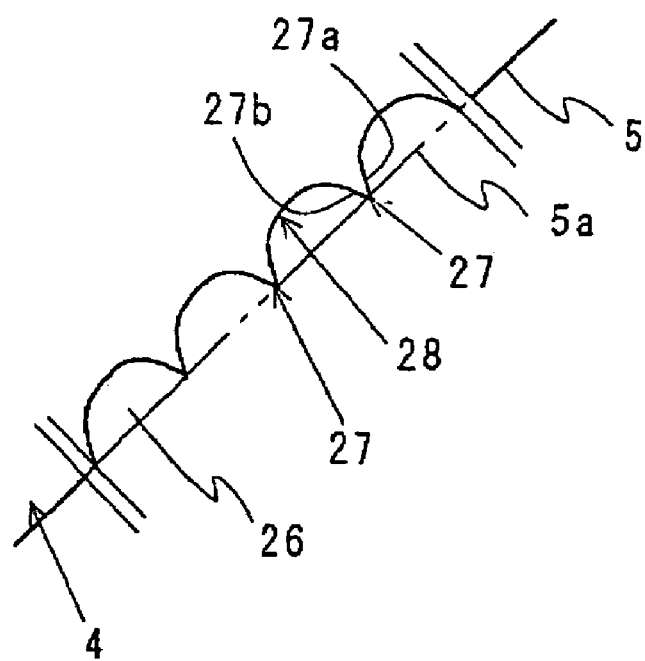
FIG. 13 is an view of a first modification of an incidence face of a light guide plate in accordance with the second embodiment.

(1) As shown in FIG. 13, left-hand slope 27b of first incidence region 27 and second incidence region 28 may be formed of a smoothly curved surface.

Figure 14:
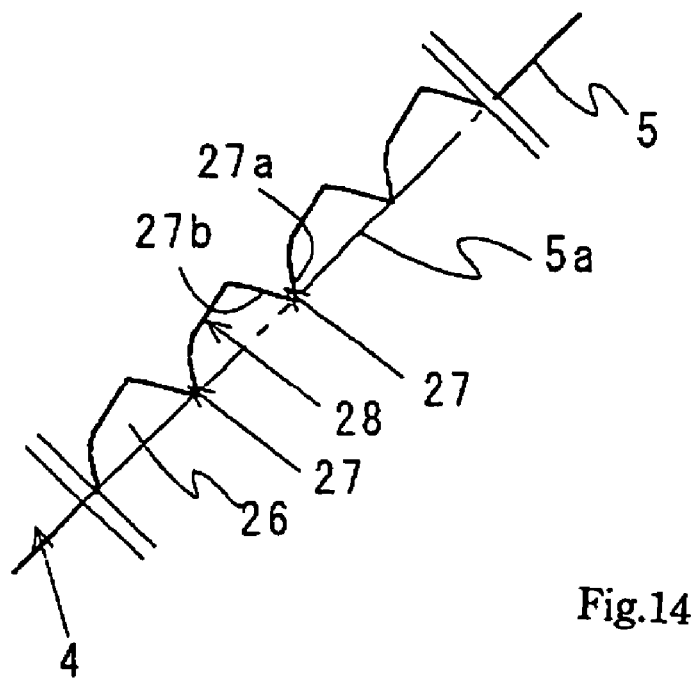
FIG. 14 is an view of a second modification of an incidence face of a light guide plate in accordance with the second embodiment.

(1) As shown in FIG. 14, right-hand slope 27a of first incidence region 27 and second incidence region 28 may be formed of a smoothly curved surface.

Figure 15:
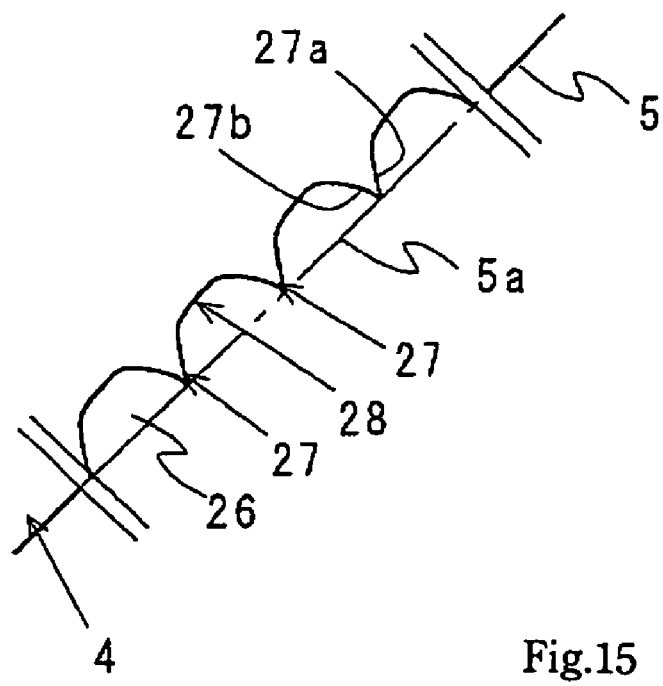
FIG. 15 is an view of a third modification of an incidence face of a light guide plate in accordance with the second embodiment.

(3) As shown in FIG. 15, left-hand and right-hand slopes 27b, 27a of first incidence region 27 and second incidence region 28 may be formed of a smoothly curved surface.

(4) As shown in FIG. 16, a top of first incidence region 27 (a portion connecting right-hand slope 27a to left-hand slope 27b), a portion connecting right-hand slope 27a of first incidence region 27 to second incidence region 28, and left-hand slope 27b of first incidence region 27 to second incidence region 28 may be formed of curved surfaces, respectively.

Incidence face 5 of light guide plate 4 may be roughened partially or overall.

Only an imaginary incidence face may be roughened in order to make a boundary between a portion giving first and second incidence regions 17, 18 and imaginary incidence face, which is not so undulated, blurred. Only first incidence region 17 may be roughened in order to cause light after entering into light guide plate 4 to have a more large diverging angle.

Alternatively, only second incidence region 18 may be roughened in order to cause light after entering into light guide plate 4 to have a moderately weakened directivity. According to still another acceptable modification, roughening may be applied at random positions so fa as functions of the present invention are not spoiled.

(Modifications of First to Third Embodiments)

FIGS. 17a and 17b illustrate light guide plate 4 employed in a modification of third embodiment.

This light guide plate 4 has four side faces 15a, 16a, 30 and 31, two side faces 15a, 16a (two sides of a rectangle-like shape) of which are adjacent to incidence face 5 and extends as to make an angle smaller than 90°. Side faces 30, 31 extend as to make 90°.

Side faces 15a and 16a are formed in a being-cut-off configuration such that they come gradually near to effective light emitting area 23 away from incidence face 5. However, effective light emitting area 23 is not eroded by them.

Inclined side faces 15a and 16a inner-reflect light, which would be otherwise urged to be emitted away from outside of effective light emitting area 23 around side faces 30, 31, toward oblique directions (toward the side of effective light emitting area 23).

This causes light to be gathered around corner portions C2, C4 which otherwise would be apt to involve dark areas.

As a result, more effectively uniformalized emission brightness can be aimed by synergism of effects of inclined side faces 15a, 16a and effects of first and second incidence regions 17, 18 (See the first and second embodiments).

Forth Embodiment

Figure 18A:
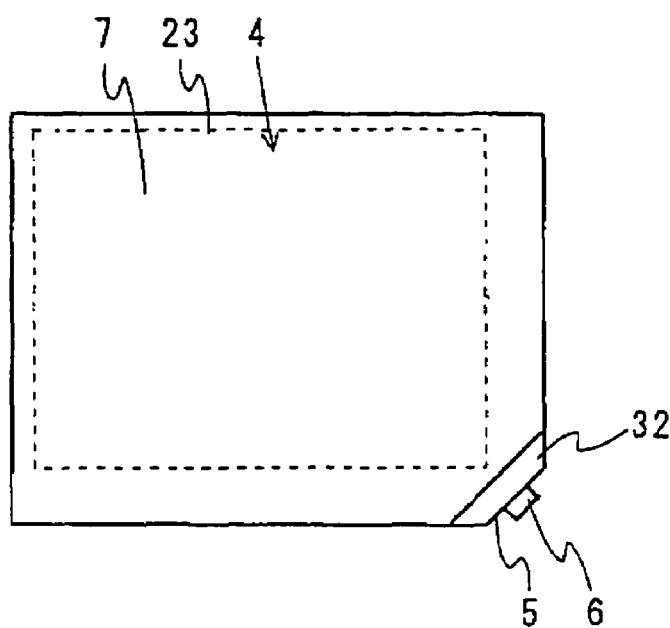
FIG. 18a is a plan view of a light guide plate in accordance with a forth embodiment.
Figure 18B:
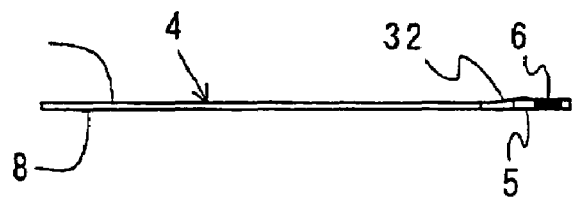
Figure 18C:
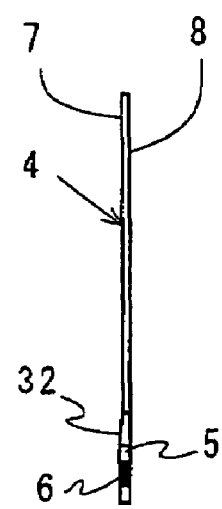
Figure 19:
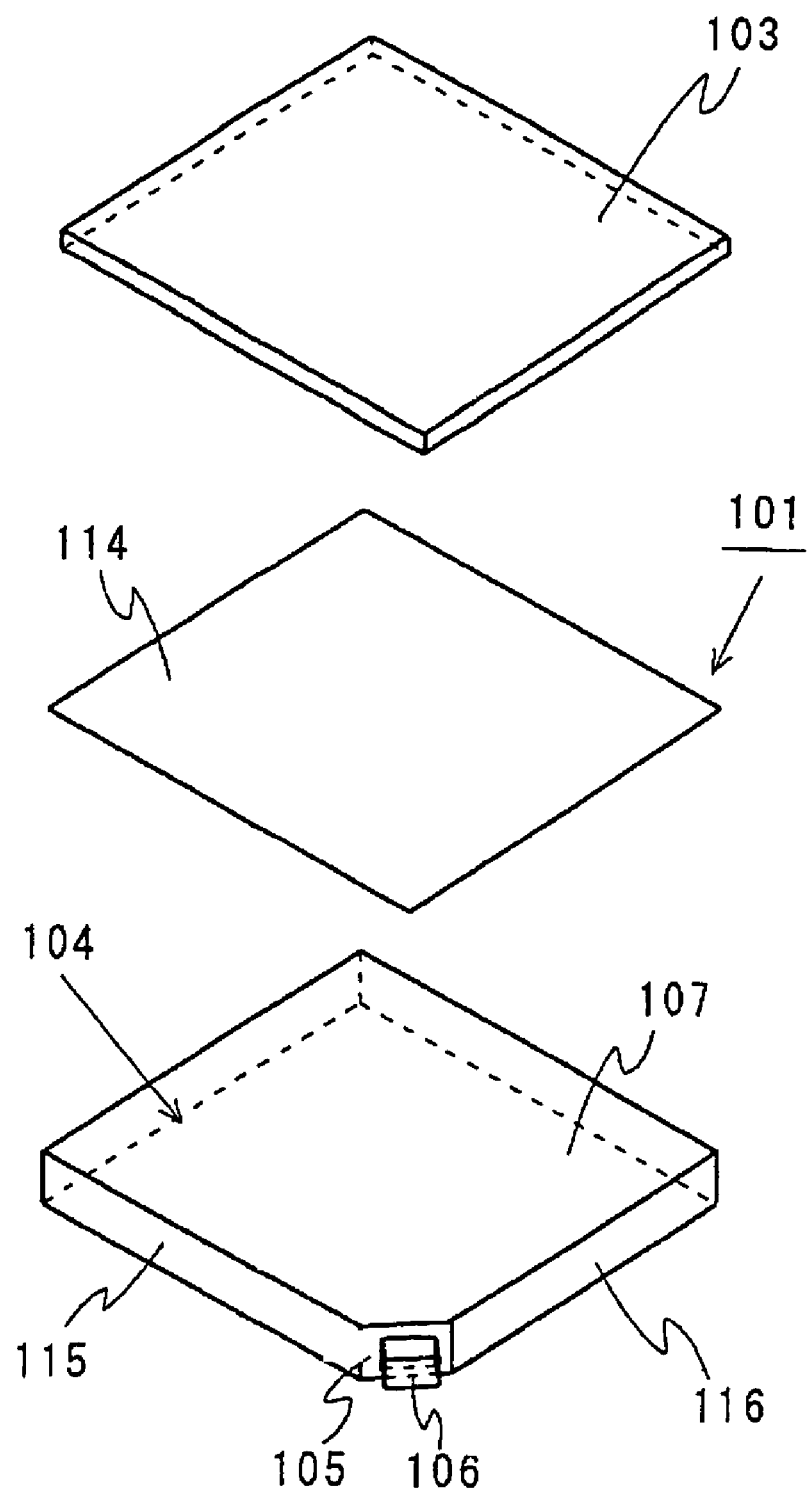
FIG. 19 is an exploded perspective view of a surface light source device in accordance with a first prior art.

FIGS. 18a and 18b illustrate light guide plate 4 employed in a modification of forth embodiment. This light guide plate 4 gradually increases in thickness as coming near to incidence face 5 from a position outside of effective light emitting area 23. Slope 32 is formed in the vicinity of incidence face 5. In other words, light guide plate 4 is provided with incidence face 5 having an increased area while thickness of light guide plate 4 is reduced in effective light emitting area 23.

As a result, not only an increased amount of light can enter into light guide plate 4 but also reduction in weight is achieved by giving a reduced thickness (to almost area including effective light emitting area 23).

It is noted that the above-described embodiments and modifications may be modified as follows.

(1) Prismatic projections or recesses of first incidence region 17 may be not configurated right-left-symmetrically. That is, first incidence region 17 may has right-hand and left-hand slopes inclinations of which are adjusted respectively and configurated asymmetrically depending on what degree of light diverging by incidence with respect to optical axis 22 of inner propagation light is desired for the right and left hands respectively.

(2) Light emitted from LED 6 has an optical axis (See FIG. 3) which accords with a normal direction of the imaginary incidence face. However, this does not limit the scope of the present invention. For instance, LED 6 may have light emitting portion 6a which extends in non-parallel with incidence face 5.

In this case, in the first place, a light diverging angle after entering into a light guide plate and optical axis 22 of inner propagation light are determined so that effective light emitting area 23 provides a uniform emission. Then, according to this, angles of right-hand and left-hand slopes of first incidence region 17 and angles of second incidence region 18 with respect to an imaginary incidence face are may be determined.

It is to be noted that a dark area could appear on an emission face because of being affected by a member employed in combination with the light guide plate. For example, a dark area possibly appear in a case where a frame accommodating the light guide is provided with a cut-off portion some part of which has a lower reflectivity as compared with the other part.

The present invention can be effective for avoiding such appearance of dark area if a direction of incidence optical axis and a diverging angle are independently designed respectively for a light guide plate in accordance with the present invention.

The present invention can be applied to surface light source devices for uses such as interior illumination devices or panels for advertising.

What is claimed is:

1. A surface light source device comprising:
   a light guide plate having an emission face of a generally rectangular first shape and a primary light source supplying primary light into said light guide plate through an incidence face formed at at least one corner portion of said light guide plate;
   said incidence face has a configuration which is obtained by undulation-modification to an oblique plane provided by cutting off said corner portion obliquely as viewed from above said emission face;
   said undulation-modification giving said incidence face first and second regions;
   said first incidence region being provided with unevenness that produces an inner propagation light having a diverging angle greater than that which would be obtained under a case where primary light was refracted on incident to said oblique plane;
   said second incidence region being provided with a slope inclined with respect to said oblique plane,
   wherein, when an inner propagation light beam of a first direction is defined as an inner propagation light beam that is produced by being refracted on incidence of a light beam along an optical axis of said primary light source onto said slope and an inner propagation light beam of a second direction is defined as an inner propagation light beam that is produced by being refracted on incidence of a light beam along an optical axis of said primary light source onto said oblique plane,
   said slope is inclined with respect to said second direction as to be deflected toward one of both sides of said second direction so that an brightness unbalance arising in a case where said first direction accords with said second direction is reduced.

2. A surface light source device according to claim 1, wherein said emission face includes an effective emission area having a second shape providing a rectangle which is formed inside of four sides provided by said first shape and smaller than said first shape in length and breadth, and,
   said second shape provides first and second sides meeting each other in the vicinity of said oblique plane, said oblique plane extending in a direction perpendicular to an angle-bisector which angle-bisects an angle made by said first and second sides and passes a corner point at which said first and second sides meet each other.

3. A surface light source device according to claim 1 or 2, wherein four sides provided by said first shape include sides with correspond to side faces adjacent to said incidence face and extend as to make an angle smaller than 90°.

4. A display comprising:
   a display panel; and
   a surface light source device for backlighting said display panel,
   wherein said surface light source device is a surface light source device according to claims 1 or 2.

5. A display comprising: a display panel; and a surface light source device for backlighting said display panel, wherein said surface light source device is a surface light source device according to claim 3.

* * * * *

UNITED STATES PATENT AND TRADEMARK OFFICE
CERTIFICATE OF CORRECTION

PATENT NO.        : 7,357,552 B2                                           Page 1 of 1
APPLICATION NO.   : 11/319157
DATED             : April 15, 2008
INVENTOR(S)       : Susuma Takada It is certified that error appears in the above-identified patent and that said Letters Patent is hereby corrected as shown below:

Column 14, Line 45 claim 1, change "with" to --which--.

Signed and Sealed this

Twelfth Day of August, 2008

JON W. DUDAS
*Director of the United States Patent and Trademark Office*